Jan. 22, 1957 A. L. APPEL 2,778,529
METERING AND DISPENSING DEVICE
Filed Oct. 18, 1954 2 Sheets-Sheet 2
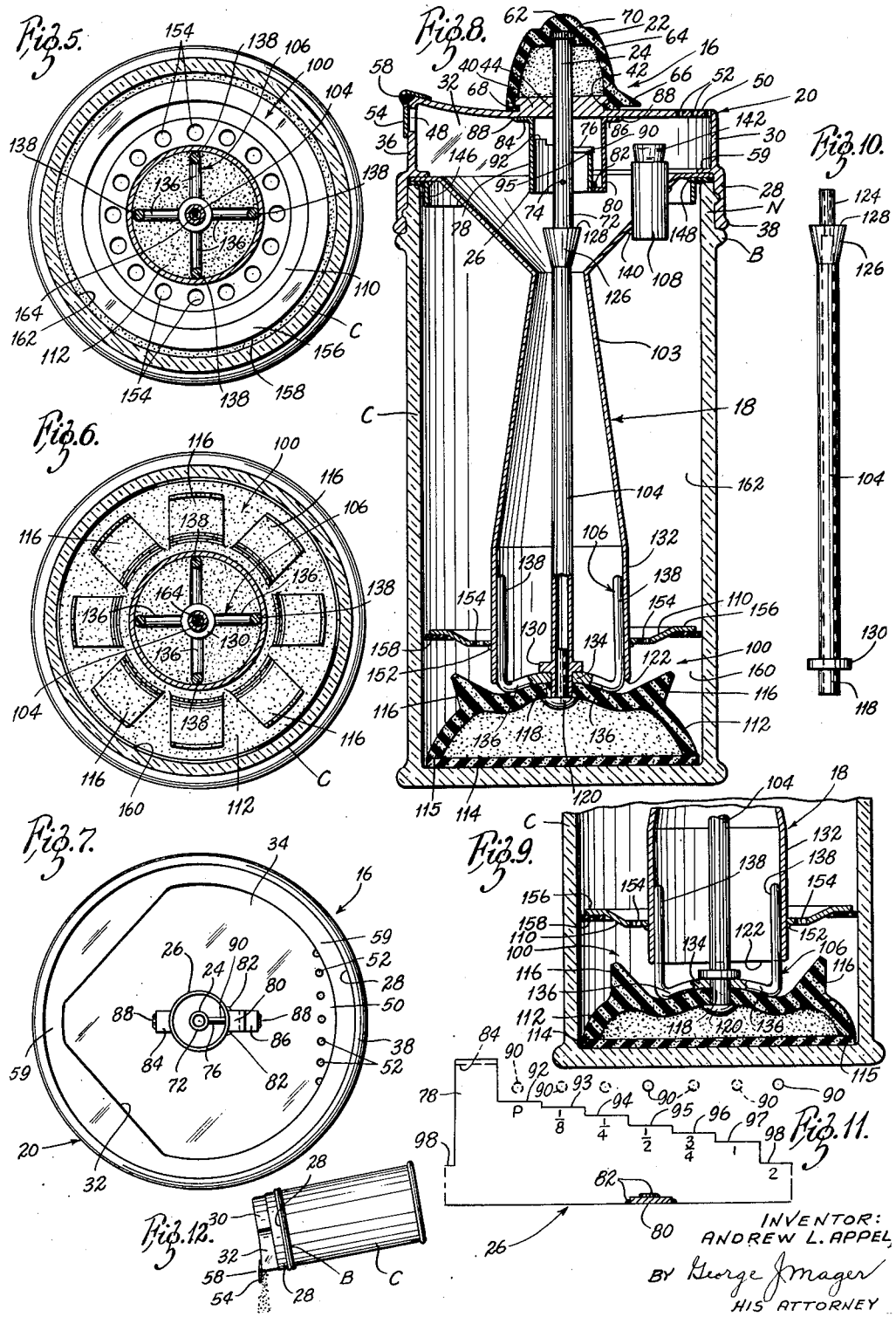
INVENTOR:
ANDREW L. APPEL,
BY George J Mager
HIS ATTORNEY

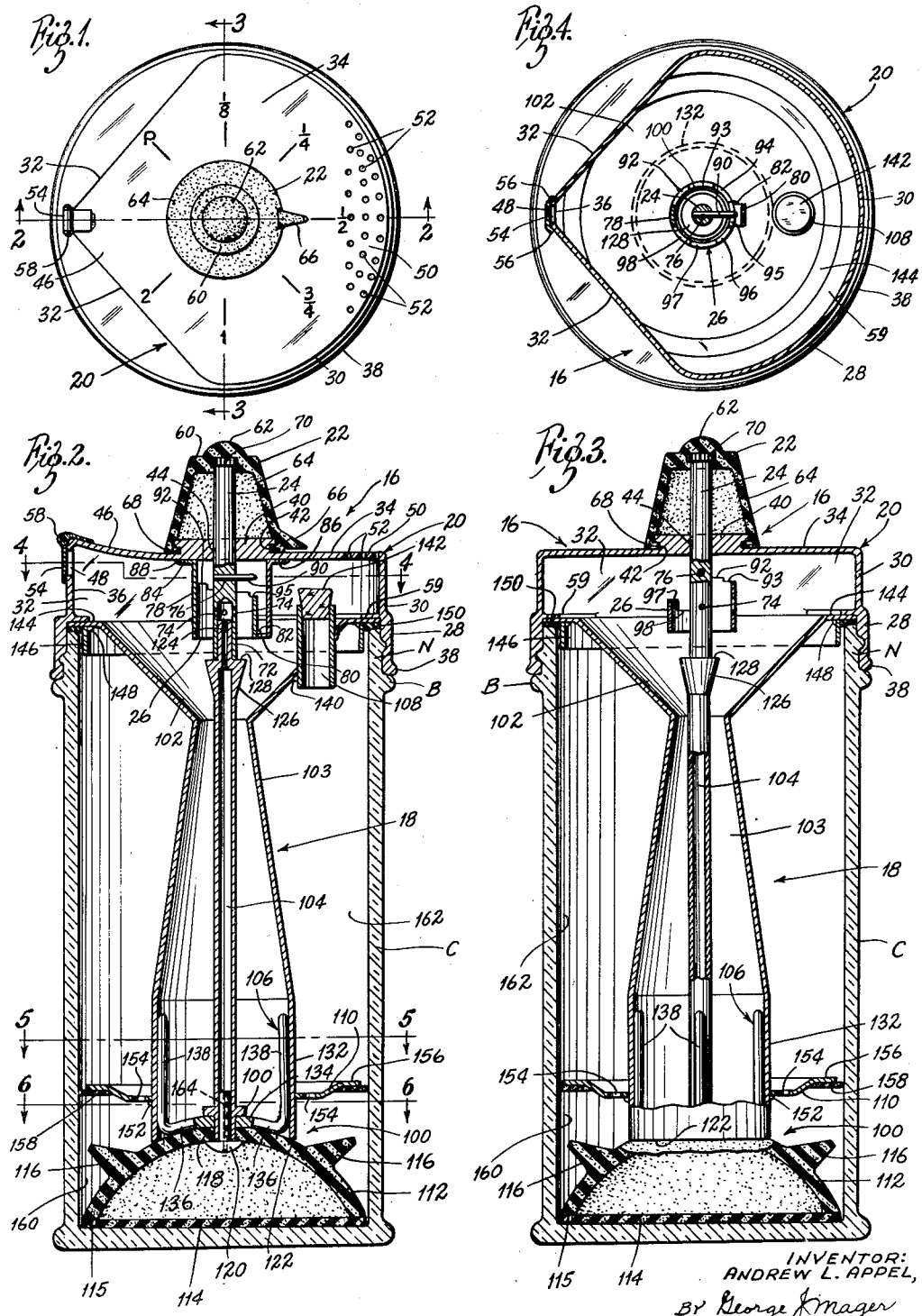

United States Patent Office 2,778,529
Patented Jan. 22, 1957

2,778,529

METERING AND DISPENSING DEVICE

Andrew L. Appel, St. Louis, Mo.

Application October 18, 1954, Serial No. 462,853

7 Claims. (Cl. 222—50)

The present invention relates to a novel and improved device designed to measure and dispense granulated materials, that are frequently enclosed in handy containers.

More specifically stated, the present invention relates to a novel and improved device adapted for dispensing metered quantities of sugar, salt, baking powder, and so on. Thus, the invention is designed primarily, although not exclusively, for use in domestic and commercial kitchens, in bakeries, and in restaurants.

With respect for example to the culinary art, it has been necessary heretofore for a cook to employ spoons, usually termed "measuring spoons," in order to obtain the requisite quantity of sugar, or salt, or baking powder and son on, to be added to the other ingredients prescribed in recipes for the preparation of foods. As is well understood, the success or failure of a dish or a cake for example, is frequently dependent upon the accuracy of the ingredients thereof, particularly those ingredients of the character enumerated above.

The principal object of my invention is to provide a device, preferably but not exclusively for use with conventional sugar or salt containers, and adapted to facilitate the measuring and dispensing of specific quantities of fluent materials, particularly materials of a granular nature.

It is another object of the present invention to incorporate means in the device whereby filling and refilling operations may be quickly accomplished.

It is further an object of the invention to provide a device that when not in use, seals the contents of the container against atmosphere. In other words, the instant invention includes means whereby the contents of a container having my device applied thereto are preserved in a dry state, so that the fluidity of them will not be impaired by moisture.

The invention includes a circular closure or cover member that is threaded internally, so that it may be removably secured in place on the externally threaded neck portion of a jar or container of well known configuration. It is to be understood however, that in the absence of a complemental threaded arrangement, the present device may be applied frictionally for example, to the open upper end of a suitable container.

As will be apparent from the description below and an inspection of the drawings that illustrate the preferred embodiment thereof, my invention is comprised of two separable but cooperative organizations of elements. The first organization or assembly of elements is disposed within the container. The second organization or assembly of elements is embodied in the aforesaid closure or cover member, and this assembly, when positioned in cooperative relation relatively to the first assembly, controls the operation thereof.

Means are provided for filling and refilling the container, and for normally sealing the contents thereof from atmosphere. Preferably, the type of container herein contemplated is of glass or the like, so that its contents are visible. In fact, the present device is primarily, though not necessarily, adapted for use with the well known type of glass containers for sugar found extensively on cafeteria and dining room tables.

The embodiment of the invention illustrated in the drawings is designed to approximately measure and thereafter dispense any selected one of seven quantities of material. In other words, a pinch, an eighth teaspoonful, a quarter teaspoonful, a half teaspoonful, a three-quarter teaspoonful, a teaspoonful, or two teaspoonfuls of material may be selected by rotating a resilient hollow knob projecting above the top of the cover member into a position wherein a pointer on the knob will coincide with a specific marking provided on the exposed top wall surface of the cover member aforesaid.

A primary opening is provided in the cover member whereby the metered quantities of material may be discharged, said opening being normally closed by a pivotally mounted flap member that functions by gravity. An inverted frusto-conical bowl or cup is disposed in the cover member below the discharge opening, and as will appear, the metered quantities of material flow into said cup and thence through said opening when the container is swung to discharge position. The control knob is rigidly attached to the upper end of a rotatable and reciprocable shaft. The lower end of said shaft is hollow for a purpose to appear, and normally engages the upper end of a tubular stem member that is supported centrally in the container, and serves to actuate the metering mechanism responsive to manipulations of the control knob. Said metering mechanism is disposed in the lower portion of the container, and the quantities of material metered thereby are delivered via a stationary tube to the cup member aforesaid when the container is tilted to a discharge position.

In addition to the primary discharge opening, the cover member may also have formed therein a plurality of small apertures that are also in communication with the chamber defined by the cup aforesaid in said cover member. This series of apertures is formed in the top wall of the cover member in an area diametrically opposite to said primary opening, and consequently metered quantities of material may be sprinkled onto meat, fish, vegetables, and so on.

Features and advantages of the invention not specifically referred to above will be noted in the course of the detailed description thereof to follow with reference to the drawings that accompany this specification. A more comprehensive understanding of the invention may further be had from the explanation of its operation that will follow, said detailed description.

In the drawings:

Figure 1 is a top plan view of a conventional container equipped with the metering and dispensing device comprising the present invention, the control knob of the device being disposed in a selected position wherein one half of a teaspoonful of material may be dispensed;

Figure 2 is a vertical sectional view taken on the line 2—2 of Figure 1;

Figure 3 is a vertical sectional view taken on the line 3—3 of Figure 1;

Figure 4 is a horizontal sectional view through the removable cover member included in the invention, taken on the line 4—4 of Figure 2;

Figure 5 is a horizontal sectional view taken on the line 5—5 of Figure 2;

Figure 6 is a horizontal sectional view taken on the line 6—6 of Figure 2;

Figure 7 is a bottom plan view of the cover member as it would appear when removed from the container;

Figure 8 is a view similar to Figure 2, demonstrating the metering operation of a one half teaspoonful of material;

Figure 9 is a fragmentary view similar to Figure 8, demonstrating the metering operation of two teaspoonfuls of material;

Figure 10 is an elevational view of the tubular stem member of the invention;

Figure 11 is a development, on an enlarged scale, of the step cylinder that governs the amount of material to be metered and dispensed in the course of each operation; and Figure 12 is a view at a reduced scale, of a container equipped with the invention, the container being shown in an exemplary disposition of angularity for dispensing a previously metered quantity of material via the primary opening in the cover member.

Broadly, the device comprising the present invention includes a control assembly generally designated 16, and a combined metering and dispensing assembly generally designated 18. The two assemblies 16 and 18 are shown cooperatively disposed relatively to a transparent container C that is exemplarily illustrated as being of clear glass.

The control assembly 16 comprises a closure or cover member 20, a resilient hollow knob 22, a control shaft 24, and a step cylinder 26.

The cover member 20 includes integrally: an internally threaded circular side wall section 28; a substantially semi-circular wall section 30 extending upwardly from the section 28; a converging wall section 32; a top wall section 34; and an apex wall section 36 that merges into said top and converging wall sections. The lower end of the side wall section 38 preferably terminates in a circular bead portion 38. The top wall 34 of the cover member is provided centrally thereof with an upwardly projecting circular boss portion 40 that is undercut to form an annular recess or peripheral groove designated 42. Centrally of the boss portion 40, there is a circular opening 44 that slidably accommodates the control shaft 24. As shown particularly in Figure 2, that portion of the top wall 34 overlying the converging wall 32 is preferably rounded upwardly as at 46. A primary material discharge opening 48 is provided in the apex wall section 36, and in an area 50 diametrically opposite thereto, the top wall 34 has formed therein a plurality of sprinkling openings 52. Numeral 54 designates a closure flap for the primary opening 48. Preferably as demonstrated in Figure 4, the flap 54 is provided with side flanges 56 adapted to engage the converging wall section 32 when said flap is in normal or closed disposition. The upper end of the flap is pivotally mounted as at 58, and said flap operates automatically in response to gravity as should be apparent. Numeral 59 designates an inwardly projecting flange of the cover member, said flange merging into the bottom surfaces of the converging wall section 32, as best seen in Figure 7.

With attention directed to Figure 1, it is observed that the exposed surface of the cover member top wall 34 is marked to exhibit a circular series of indicia for the guidance of the user, as will be explained more comprehensively hereinafter. The individual markings are spaced apart 45°, and indicate in a clockwise direction: a pinch of material; one eighth teaspoonful of material; a quarter teaspoonful; a half teaspoonful; a three-quarter teaspoonful; one teaspoonful; and two teaspoonfuls of material.

The hollow knob 22 is flexible and resilient, being preferably formed of rubber, as shown. It includes integrally: a top wall 60 having a dome segment 62 formed thereon; and a conical side wall 64 provided with a pointer segment 66. Internally at its lower end, the side wall 64 has formed therein a circular flange 68 that engages in the groove 42 of the top wall boss portion 40, whereby the knob 22 is maintained rigidly although rotatably in place.

The control shaft 24 as hereinbefore noted, is slidably disposed for vertical movements in the opening 44. At its upper end, the shaft 24 terminates in a knurled or splined and slightly enlarged head 70, that is rigidly bonded into the top wall 60 of the knob 22, so that said shaft and knob operate as a unit. The lower end portion 72 of the shaft 24 is hollow, and as shown especially in Figure 2, is provided with a plurality of radial ports 74. Approximately intermediate the upper and lower ends thereof, the shaft 24 has pressfitted therein as shown, or otherwise secured thereto, one end of a laterally projecting pin 76, that is disposed in vertical alignment with the pointer 66 of the knob 22.

The step cylinder 26 is so named because it has formed therein a series of lands or steps separated by risers, as will appear. The cylinder 26 is rigidly secured to the underside of the cover top wall 34 by means of an upwardly projecting bracket segment 78 intergally formed with said cylinder, and a diametrically opposite angular bracket 80 rigidly secured to the lower periphery of the cylinder, as suggested by welding 82 in Figures 2 and 7. The upper ends of the brackets 78 and 80 terminate in outstanding flanges 84 and 86 respectively, and these flanges are secured to said cover member top wall undersurface, as suggested by welding 88.

As seen to best advantage in Figure 4, the bracket segment 78 projects upwardly from the periphery of the cylinder 26 whereas the attached bracket 80 is spaced laterally therefrom. This figure also demonstrates clearly, that the free or projecting end 90 of pin 76 overlies the periphery of the step cylinder 26. Thus, inasmuch as the bracket 80 is spaced laterally from said cylinder, the control shaft 24 may revolve clockwise or counter-clockwise throughout an arm of 315° only, the bracket segment 78 being in the path of pin 76, thus prohibiting movement of said shaft through the remaining 45° of a complete revolution thereof.

A development of the step cylinder 26, and schematic dispositions of the free end 90 of pin 76 relatively thereto are portrayed in Figure 11. Seven steps are provided, each step, considered from left to right, being disposed in a successively lower plane. Numerals 92 through 98 designate the individual steps, and it is noted that all of them are coextensive in length, so that in the actual cylinder, each step extends throughout 45° of the periphery thereof. In this view, each step has also been designated with the marking appearing directly thereabove on the exposed surface of the cover top wall 34.

From the foregoing description and reference to the drawings, it is believed clear that the control assembly 16 constitutes a self-contained unit adapted, when the pointer segment 66 is brought into registry with a selected one of the indicia on the cover member, to position the free end 90 of pin 76 directly above the corresponding step of cylinder 26. The illustrated container C has an externally threaded neck portion N, the lower end thereof being defined by the usual annular bead B.

The assembly 18 includes: metering mechanism generally designated 100 that is disposed in the lower portion of container C; an inverted frusto-conical cup member designated 102 that is disposed in the upper portion of said container; a metered material delivery tube 103 leading from the mechanism 100 to the cup member 102; a tubular stem 104 that operatively connects the control assembly 16 and said metering mechanism; a guide member generally designated 106 for the stem; a filler pipe 108; and a disk 110 that is also disposed in the lower portion of the container but in a plane above that of the metering mechanism.

With particular reference now to Figures 2, 5, and 6, the mechanism 100 includes: a substantially semi-circular segment of a hollow rubber ball designated 112, that is sealed by means of a rubber disk 114 bonded thereto along the lower peripheral edge 115 thereof; a series of circularly spaced material-feeding fingers 116; the lower end portion 118 of the stem 104; the aforesaid guide member 106; a hollow headed pin 120; and the lower peripheral edge 122 of the delivery tube 103.

The tubular stem 104 is shown per se in Figure 10. The upper end 124 of said stem is so reduced in diameter as to freely enter the hollow lower end 72 of the control shaft 24, and to define in conjunction with an enlarged conical portion 126 of the stem, a circular abutment or shoulder 128, that is horizontally disposed. Adjacently to the lower end 118 thereof, the stem 102 has formed thereon an annular flange 130.

The guide member 106 is slidably disposed in the lower cylindrical portion 132 of the delivery tube 103. It is of spider-like configuration, and includes an apertured central body portion 134 having a plurality of circularly spaced radial legs 136, four legs being preferable as shown especially in Figures 3, 5, and 6. The legs 136 are arcuately contoured for intimate contact with the upper surface of the rubber ball segment 112, and each leg merges at its outer end into an upstanding guide rod 138. The guide member 106 is maintained in place between the ball segment 112 and stem collar 130 by means of the hollow pin 120, that also serves to provide a rigid connection between said ball segment and the stem 104. The pin 120 is press-fitted into the lower end portion 118 of the hollow stem prior to the fusion of the disk 114 onto the lower peripheral edge 115 of the ball segment 112.

The filler pipe 108 is disposed in an opening in the conical wall of the cup member 102 as shown, and is maintained in place as by welding suggested at 140, or otherwise. Normally, the upper end of said pipe is sealed, a common cork stopper 142 serving adequately for this purpose.

The cup member 102 terminates at its top in a circumferential flange 144, and a guide ring 146 is dependingly supported from said flange, being rigidly attached thereto as by welding or soldering suggested at 148. Numeral 150 indicates a compressible annular gasket that is interposed between the flange 144 and the top rim of the container neck portion N, as shown. Preferably, this gasket is bonded to the undersurface of the cup member flange 144.

The disk 110 has a central opening therein, and is permanently attached to the cylindrical periphery of the delivery tube lower portion 132 as by welding suggested at 152. As best seen in Figure 5, said disk is provided with a circular series of holes 154 affording free passage therethrough of granular material. Bonded to the undersurface of the peripheral flange portion 156 of disk 110, is a flexible gasket 158. The external diameter of the gasket 158 preferably corresponds to the internal diameter of the container C. The disk 110 and the gasket 158 divide the container interiorly into a lower chamber 160, and an upper chamber 162.

The material-feeding fingers 116 project upwardly from and are molded integrally with the substantially semi-circular rubber ball segment 112, in consequence whereof the disposition of them will fluctuate when said segment is deformed. An air bleeding port in the headed pin 120 is designated by the numeral 164.

From the foregoing description and reference to the drawings, it should be evident that the combined metering and dispensing assembly 18 constitutes a self-contained unit that may easily be deposited into a container of the type under consideration. The inherent flexibility of the gasket 158 accommodates such insertion even though the inner periphery of the container may not be perfectly circular. Said gasket and the disk 110 to which it is bonded, also impart a degree of rigidity to the delivery tube 103, and thus to the hollow stem 104. The hollow ball segment 112 though flexible, is extremely resilient inasmuch as its arcuate wall is rather heavy, and further, because it is hermetically sealed except for the slight venting that is provided for by the bleed passage 164 in conjunction with the tubular stem 104, and the radial ports 74 of the control shaft. The guide ring 146 is provided to facilitate insertion of the assembly 18 into the container, but obviously this ring may be omitted if desired.

Once the metering and dispensing assembly 18 has been properly positioned within container C, removal thereof is not contemplated unless malfunctioning of the metering mechanism should develop, as is understood. The container is originally filled via the filler pipe 108 until the level of the selected granular material reaches that of the bead B, whereupon the stopper 142 is applied to the upper end of said pipe. Thereupon the control assembly 16 is screwed into place, so that the cover member bead 38 will be in contact with the container bead B. Rotation of the cover member 20 during this operation, serves to bring the hollow lower end portion 72 of the control shaft 24 into contact with the annular shoulder 128 of the tubular stem conical portion 126.

With the control assembly 16 thus disposed relatively to the metering and dispensing assembly 18, the container C is in condition for use. The material in the lower chamber 160 is the more fluent so to speak, because much of the material in the chamber 162 thereabove is independently supported by the disk 110 and its associated gasket 158. It is noted at this point, that whenever after repeated dispensings the material level descends to a plane approximating that of said disk, the control assembly 16 may be removed without disturbing the disposition of the assembly 18, in order to refill the container via the pipe 108.

*Operation and use*

For the purpose of describing the operation and use of the invention, granulated sugar has been chosen to exemplify the material to be measured and dispensed. Thus, assuming that the container has been filled as described above, and assuming further that a certain receipe for example prescribes a pinch of sugar to be added to other ingredients, the control knob 22 would be rotated counterclockwise from the position thereof shown in Figure 1, until the radial disposition of its pointer segment 66 corresponded approximately with the marking P on the exposed surface of cover member top wall 34. In consequence of so rotating the knob, the control shaft 24 would position the free end portion 90 of pin 76 in a plane above that wherein the step 92 of cylinder 26 lies, the distance between said planes being slight, as diagrammatically demonstrated in Figure 11. Manual downward pressure thereupon applied to the dome 62 would move the control shaft 24 downwardly until the end portion 90 of pin 76 would engage the step 92. As a result, the hollow stem 104 and the guide 106 would simultaneously move downwardly to depress the rubber ball segment 112 slightly, thus producing a minute circular clearance or space between the lower peripheral edge 122 of the delivery tube 103, and the depressed area of said ball segment. Concurrently, the eight feed fingers 116 of said ball segment would swing slightly inwardly, whereby to agitate the sugar in the lower compartment 160 somewhat and direct some of it toward said clearance space. When the manual pressure on the dome 62 is released, the resiliency of the ball segment automatically effects the return thereof to the position illustrated in Figures 2 and 3, whereby a small quantity or pinch of sugar will be trapped within the lower end of the delivery tube cylindrical portion 132, and thus segregated from the mass of sugar in the container. Assuming now that the container were taken in hand and tilted angularly into a position such as that illustrated in Figure 12, the pinch of sugar would slide via delivery tube 103 into cup 102, and continue on to the primary discharge opening 48, the converging cover member wall 32 facilitating the movement. Tilting of the container in the manner illustrated automatically disposes the closure flap 54 to open status, so that the pinch of sugar may be discharged.

Assuming now that another recipe for example prescribes that a half teaspoonful of sugar be added to other ingredients, the control knob 22 would be rotated clockwise from the marking P to the position thereof shown in Figures 1 and 2. That is to say, the knob would be rotated until the radial disposition of its pointer segment 66 corresponded approximately with the marking ½ on the exposed surface of the cover member top wall 34. In such disposition of the knob 22, the control shaft 24 locates the end portion 90 of pin 76 in the same plane as before, but above that wherein the step 95 lies, as Figure 11 also demonstrates. Manual downward pressure now applied to the dome 62 will move the control shaft 24 downwardly a greater distance than in the previous example, that is, until the end portion 90 of pin 76 engages the step 95. As a result, the hollow stem 104 and the guide 106 will simultaneously move downwardly to depress the rubber ball segment 112 from the status exhibited in Figure 2, to the status thereof exhibited in Figure 8. Consequently, a circular clearance or space is produced between the lower peripheral edge 122 of the delivery tube 103, and the depressed area of said ball segment. Obviously, this space will accommodate an increased amount of sugar directed thereinto by the feed fingers 116 that swing inwardly from the position exhibited in Figure 2, to the position thereof exhibited in Figure 8. When the manual pressure on the dome 62 is released, the resiliency of the ball segment automatically effects the return thereof to the position illustrated in Figures 2 and 3, whereby a half teaspoonful of sugar will be trapped within the lower end of the delivery tube cylindrical portion 132, and thus segregated from the mass of sugar in the container. This half teaspoonful of sugar would obviously be dispensed in the manner hereinbefore explained.

Assuming now for example, that a person desired a teaspoonful of sugar, he would manipulate the knob 22 until its pointer 66 registered approximately with the marking 1 on the cover plate top wall 34. This action would dispose the end portion 90 of pin 76 above the step 97, so that should the procedure explained hereinbefore be followed, a teaspoonful of sugar could be discharged from the primary opening 48.

In contemplation of the foregoing explanation, it is deemed to be manifest that any preselected quantity of material included within the range provided by the invention, may be metered and dispensed. A final example of a metering operation is demonstrated in Figure 9, with attention directed also to Figure 11. Figure 9 shows the depressed and consequently deformed condition of the rubber ball segment 112 resulting when pressure is applied to dome 62 after the pointer segment 66 thereof has been directed toward the marking 2 on the cover member top wall. In this status of the ball segment 112, two teaspoonfuls of sugar will have been fed into the circular space produced between the peripheral edge 122 of the delivery tube and the depressed area of ball segment 112, in consequence of the concurrent inward movement of the feeding fingers 116 and the deformation of said ball segment. Thus it should be evident that when the manual pressure on the knob is released, the ball segment 112 will revert to its Figure 1 status, whereby to confine or trap two teaspoonfuls of sugar within the cylindrical portion 132 of the delivery tube 103.

It is to be understood of course, that the planar disposition of each step 92 to 98 inclusive relatively to the constant planar disposition of the pin 76 will have been pre-calculated in order to provide for sufficient depression of the ball segment 112 to meter quantities of material in accordance with the knob settings. It is also to be understood that the steps 92 to 98 may be increased or decreased in number. Further, the disposition of them may be varied to provide for metering quantities of material other than those exemplarily given herein.

The bleed passage 164 in pin 120 is provided for the escape of air when the ball segment 112 is depressed, as is understood. The air may escape via the tubular stem 104 and the radial ports 74 provided in the hollow lower end 72 of the control shaft 24. The hollow flexible rubber knob 22 accommodates depressions of the control shaft 24, and the arcuate configuration of the guide member legs 136 insures an immediate response on the part of the ball segment to depressions of said shaft.

It will be noted from an inspection of Figure 6, that the illustrated embodiment of the invention includes eight feed fingers 116. In the interest of clarity however, those fingers 116 that should appear in the background have been omitted in Figures 2, 3, 8, and 9. The fingers 116 are illustrated as being integrally formed with the ball segment 112, but they may obviously be separately molded and bonded thereto if desired.

The disk 110 and its associated gasket 158 serve not only to divide the container into a lower chamber 160 and an upper chamber 162, but also serve to maintain the sugar in fluent condition. Thus, whenever the container is tilted to a dispensing position as suggested in Figure 12, sugar then in the lower chamber 160 flows freely via the holes 154 into the upper chamber. Following a dispensing operation and during the subsequent erection and disposition of the container on a table or the like, sugar again fills the lower chamber 160, flowing thereinto from the chamber 162 via said holes 154 of the disk 110.

With particular reference to Figures 1 and 2, it is noted that instead of discharging metered quantities of sugar via the primary opening 48 as demonstrated in Figure 12, the sugar may be sprinkled via the small openings 52 with the container rotated 180° from the position shown.

It is to be understood as hereinbefore mentioned, that granulated sugar has been selected exemplarily only as a medium well suited to explain the operation and use of the invention. Salt and other dry fluid materials may also be metered and dispensed in the manner described.

The invention is believed to be particularly adaptable for use with conventional sugar containers of the type usually found on dining room tables. Most of these containers are equipped with dispensing means, but insofar as I am aware, they are not provided with means for pre-selecting and metering the amount of sugar desired. Consequently, a patron who desires, for example two teaspoonfuls of sugar in his tea or coffee, must rely on his own judgment as the sugar flows from the container discharge spout into the spoon he suspends therebeneath. Generally, the sugar will overflow the spoon, resulting in waste and table untidiness. In an embodiment of the invention for use with sugar containers in dining rooms, the metering range could be limited for example to one, two, and three teaspoonful dispensings, thus requiring but three markings on the cover top wall 34, and three steps on the cylinder 26. Also, the series of sprinkling openings 52 could be omitted in such an exemplary adaptation of the invention.

From the foregoing description and the drawings, it is believed manifest that the invention provides novel means for attaining its objectives. Inasmuch however, as changes in the structural elements may be made without departing from the principles thereof, it is to be understood that the invention is not limited to the precise details of construction illustrated and described.

What I claim is:

1. In a device for use with a container of the type described: a combined metering and dispensing assembly for granular material mounted in the container including means to divide said container into an upper and a lower compartment, the metering mechanism of said assembly being disposed in the lower of said compartments; a control assembly for regulating the metering mechanism of said combined assembly mounted on and closing the upper end of the container; means through which the container is adapted to be filled with granular material after removal of the control assembly without disturbance of the metering and dispensing assembly aforesaid; means normally sealing the filled container contents from atmosphere; means incorporated in the control assembly for discharging selected metered quantities of material from said container in response to tilting the container into a discharge position; means incorporated in said combined metering and dispensing assembly for automatically agitating the non-metered material therein prior to, during, and subsequently to a discharge operation, said means being embodied in the aforesaid means that divides the container into an upper and a lower compartment; and manually operable means incorporated in the control assembly for preselecting the quantity of material to be first metered and thereafter dispensed.

2. In a device for use with a container of the type described: a cover member for the container; means through which the container is adapted to be filled with dry fluent material; means for preselecting the quantity of material to be dispensed; metering mechanism disposed in the lower portion of the container for segregating the selected quantity from the mass of material in the container; manually operable means for actuating the metering mechanism; a normally closed material discharge opening in said cover member; means for delivering the segregated quantity of material to the discharge opening when the container is tilted to a position wherein said discharge opening is disposed below the plane of the metering mechanism; and means automatically effective to agitate the mass of material in the container as it is being tilted to the position aforesaid, said means comprising a disk that is rigidly supported in the lower portion of the container in a plane above that of the metering mechanism and is provided with a circular series of holes affording free passage therethrough of said material.

3. In a device for use with a container of the type described: a cover member for the container; means through which the container is adapted to be filled with dry fluent material; means for preselecting the quantity of material to be dispensed; metering mechanism disposed in the lower portion of the container for segregating the selected quantity from the mass of material in the container; manually operable means for actuating the metering mechanism; a normally closed material discharge opening in said cover member; means including a stationary cylinder for delivering the segregated quantity of material to the discharge opening when the container is tilted to a position wherein said discharge opening is disposed below the plane of the metering mechanism; and means automatically effective to agitate the mass of material in the container as it is being tilted to the position aforesaid; said metering mechanism including a substantially semicircular segment of a hollow rubber ball sealed by means of a rubber disk bonded thereto along the lower peripheral edge thereof, and provided with a circularly spaced series of material-feeding fingers projecting upwardly from the upper peripheral surface thereof, said upper peripheral surface being normally in contact with the lower peripheral edge of said stationary cylinder whereby to seal the cylinder against the entry thereinto of material in the container about the ball segment; said means automatically effective to agitate the material in the container during tilting thereof comprising a disk that is rigidly secured to said cylinder in a plane above the upper peripheral surface of the ball segment and is provided with a circular series of holes affording free passage therethrough of said material.

4. A device for metering and therafter dispensing preselected quantities of fluent material contained in a container of the character described, said device including in combination a removable cover member for the container: manually rotatable means mounted on and supported from the cover member for pre-selecting the desired quantity of material to be dispensed; metering mechanism disposed in the lower portion of said container adapted to segregate the selected quantity from the material in the container responsive to actuations of said metering mechanism; manually operable means for actuating the metering mechanism; a primary opening and a series of sprinkling openings provided in the top wall of the cover member for discharging the selected quantity of material, said sprinkling openings being formed in an area of the cover member top wall that is diametrically opposite the primary opening; and means including a tube suspended centrally of the container leading from the metering mechanism to said openings for delivering the selected quantity of material selectively to the primary opening or to the sprinkling openings when the container is tilted angularly downwardly into a plane wherein said primary opening is, or said sprinkling openings are, disposed below that of the metering mechanism; said metering mechanism including a substantially semicircular segment of a hollow rubber ball sealed by means of a rubber disk bonded thereto along the lower peripheral edge thereof, the upper peripheral surface of said ball segment being normally in contact with the lower peripheral edge of said tube whereby to seal the tube against the entry thereinto of material in the container about the ball segment.

5. A device as set forth in claim 4, wherein the manually rotatable means for pre-selecting the desired quantity of material to be dispensed includes: a vertical shaft slidably and rotatably disposed in an opening provided therefor in the upwardly projecting central boss portion of the cover member removably mounted on the upper end portion of the container, said shaft terminating at the top in a knurled or splined and slightly enlarged head portion; a flexible resilient hollow knob member, including a top wall having a dome segment formed thereon and a conical side wall, bonded to said head portion of the shaft; a circular internal flange formed in the lower end portion of said side wall engaged in an external groove provided therefor in the boss portion aforesaid of the cover member; a pointer segment on the knob member; a circular series of markings on the top wall surface of the cover member; a step cylinder rigidly supported from the underside of said cover member top wall and disposed about said shaft, said cylinder having a series of steps disposed in different planes and corresponding in number to the markings on the cover member; and a pin rigid with said shaft disposed in a plane above that wherein the uppermost step of said cylinder lies.

6. In a device of the character and for the purpose described: a cover member removably attached to the upper end of a container; a boss having an opening therein projecting upwardly centrally of the top wall of the cover member; a vertical shaft slidably disposed in said boss opening; a hollow flexible knob of resilient rubber bonded to the upper end of the shaft for manual rotations and depressions thereof; a pointer segment on the knob; a stationary cylinder having formed in its upper peripheral edge a series of lands or steps separated by risers, each step beginning with the uppermost being disposed in a successively lower plane; bracket means suspending said cylinder from said top wall of the cover member dependingly about a portion of said shaft; and a laterally projecting pin rigid with the shaft in vertical alignment with said pointer and normally disposed in a plane above that wherein said uppermost step of the cylinder lies.

7. In a device for dispensing preselected quantities of fluent material contained in a container of the character described, metering mechanism disposed in the lower portion of said container and adapted to segregate the selected quantity of material from the mass of material in the container, said mechanism comprising: a stationary cylinder supported centrally in the container; a substantially semi-circular sealed rubber ball segment normally in intimate contact with the lower peripheral edge of said cylinder; a guide element slidable in the cylinder and having arcuate leg members in contact with that portion of the ball segment exposed within the cylinder; a vertically disposed tubular stem for moving said guide element downwardly whereby to depress said ball segment; a hollow headed pin press-fitted into the lower end of said stem for venting said ball segment when it is depressed, and for rigidly securing said stem and the guide element to the ball segment; and a plurality of circularly spaced upwardly projecting feed fingers on the ball segment adapted to move inwardly toward said peripheral edge of the cylinder whenever said ball segment is depressed.

References Cited in the file of this patent

UNITED STATES PATENTS

| | | |
|---|---|---|
| 933,699 | De Laurence | Sept. 7, 1909 |
| 1,724,766 | McCauley | Aug. 13, 1929 |
| 1,871,175 | Brunwald | Aug. 9, 1932 |
| 1,941,745 | Higley | Jan. 2, 1934 |
| 2,554,710 | Leccese | May 29, 1951 |
| 2,579,977 | Sjolin | Dec. 25, 1951 |
| 2,653,746 | MacDonald | Sept. 29, 1953 |

FOREIGN PATENTS

| | | |
|---|---|---|
| 241,074 | Great Britain | Oct. 15, 1925 |